(12) United States Patent
Suzuki

(10) Patent No.: US 7,100,470 B2
(45) Date of Patent: Sep. 5, 2006

(54) GEAR CHANGE DEVICE

(75) Inventor: Michinobu Suzuki, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 11/035,079

(22) Filed: Jan. 14, 2005

(65) Prior Publication Data

US 2005/0109147 A1   May 26, 2005

Related U.S. Application Data

(62) Division of application No. 10/180,124, filed on Jun. 27, 2002, now Pat. No. 6,892,601.

(30) Foreign Application Priority Data

| Jun. 29, 2001 | (JP) | ............................. 2001-198680 |
| Jul. 2, 2001 | (JP) | ............................. 2001-200803 |
| Jul. 2, 2001 | (JP) | ............................. 2001-200804 |

(51) Int. Cl.
*B60K 17/04* (2006.01)
*B60K 20/00* (2006.01)
*F16H 59/00* (2006.01)
*H01F 5/00* (2006.01)

(52) U.S. Cl. .................. 74/473.12; 74/335; 74/473.3; 74/473.33; 335/266

(58) Field of Classification Search .................. 74/335, 74/473.12, 473.1, 473.3, 473.33, 336 R, 74/337, 473.21
See application file for complete search history.

(56) References Cited

U.S. PATENT DOCUMENTS

| 5,590,563 | A | * | 1/1997 | Kuwahata et al. ......... 74/337.5 |
| 6,065,363 | A | * | 5/2000 | Schaller et al. .......... 74/473.12 |
| 6,634,249 | B1 | * | 10/2003 | Yamamoto ............... 74/473.12 |
| 6,732,607 | B1 | * | 5/2004 | Yamamoto et al. ...... 74/473.12 |
| 6,739,211 | B1 | * | 5/2004 | Yamamoto et al. ........... 74/335 |
| 6,810,762 | B1 | * | 11/2004 | Suzuki ...................... 74/473.3 |
| 6,889,573 | B1 | * | 5/2005 | Hayashi et al. .......... 74/473.12 |
| 6,892,601 | B1 | * | 5/2005 | Suzuki ...................... 74/473.3 |

FOREIGN PATENT DOCUMENTS

| DE | 33668 | 12/1964 |
| DE | 297 13 355 U 1 | 9/1997 |
| DE | 198 42 532 A 1 | 9/1999 |

OTHER PUBLICATIONS

European Search Report dated Feb. 16, 2004.

* cited by examiner

*Primary Examiner*—Richard Ridley
*Assistant Examiner*—Colby Hansen

(57) ABSTRACT

A gear change device including a shift lever support mechanism arranged in a casing to support a shift lever so as to slide in the axial direction of the casing and to rotate, a select actuator for operating the shift lever support mechanism to slide the shift lever in the axial direction which is the direction of selection, and a shift actuator for rotating the shift lever support mechanism to rotate the shift lever in the direction of shift. The shift actuator has an operation lever, with a base portion mounted on the shift lever support mechanism, and a pair of electromagnetic solenoids arranged facing each other, with the acting portion of the operation lever interposed therebetween. The solenoids are inclined with respect to the horizontal direction. A compression spring produces an urging force in the direction of operation of the electromagnetic solenoid which operates upward along the inclination.

1 Claim, 7 Drawing Sheets

Fig. 3
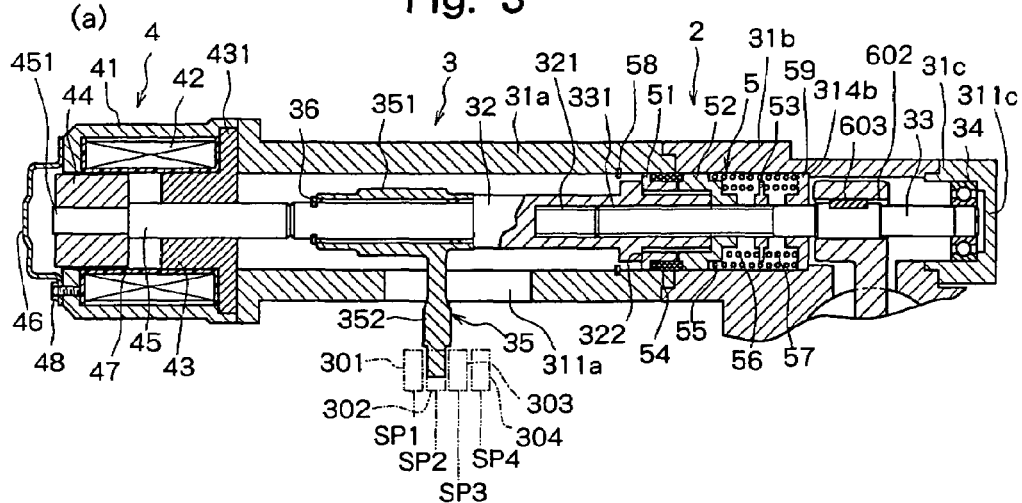
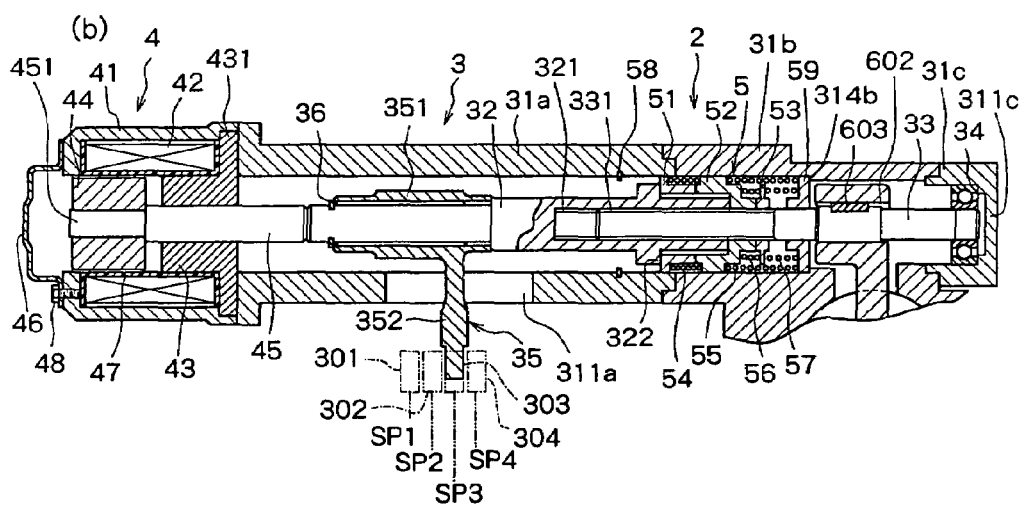
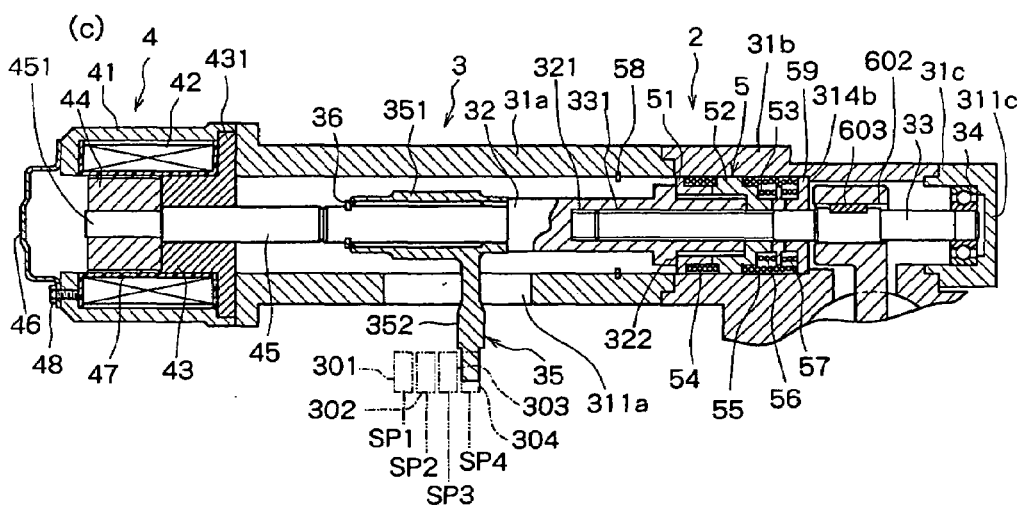

GEAR CHANGE DEVICE

CROSS REFERENCE TO RELATED APPLICATION

The present Application is a Divisional Application of U.S. patent application Ser. No. 10/180,124, filed on Jun. 27, 2002 now U.S. Pat. No. 6,892,601.

FIELD OF THE INVENTION

The present invention relates to a gear change device for shifting a transmission mounted on a vehicle.

DESCRIPTION OF THE RELATED ART

A gear change device for shifting a transmission comprises a select actuator for actuating a shift lever of a speed-changing mechanism in a direction of selection and a shift actuator for actuating the shift lever in a direction of shift.

As the select actuator and the shift actuator, there are usually used fluid pressure cylinders using a fluid pressure such as pneumatic pressure or hydraulic pressure as a source of operation. The select actuator and the shift actuator employing the hydraulic cylinders require pipes for connecting the source of fluid pressure to each of the actuators, require electromagnetic change-over valves for changing over the flow passage of the operation fluid, and require space for arranging the above components, resulting in an increase in weight of the device as a whole.

In recent years, there have been proposed a select actuator and a shift actuator constituted by electric motors as a gear change device for a transmission mounted on a vehicle which is provided with neither a source of compressed air nor a source of hydraulic pressure. The select actuator and the shift actuator constituted by electric motors can be constituted in a compact size as a whole and in a reduced weight since they need neither the pipes for connection to the source of hydraulic pressure nor the electromagnetic change-over valve unlike the actuators that use fluid pressure cylinders.

The actuators using electric motors require a speed reduction mechanism for obtaining a predetermined operation force. As the speed reduction mechanisms, there have been proposed the one using a ball-screw mechanism and the one using a gear mechanism. However, the actuators using the ball-screw mechanism and the gear mechanism are not necessarily satisfactory in regard to durability of the ball-screw mechanism and of the gear mechanism and in regard to durability and the operation speed of the electric motors.

As a source of driving the select actuator and the shift actuator capable of operating the shift lever in the direction of shift and in the direction of selection without using the speed reduction mechanism, the present applicant has proposed a gear change device using an electromagnetic solenoid in Japanese Patent Application No. 183470/2001. However, this electromagnetic solenoid has moving members such as a moving iron core having a large mass that operates in the axial direction and hence, the moving member is affected by its own gravity. Therefore, the operation force changes depending upon the arrangement of the electromagnetic solenoid. Particularly, in the shift actuator having a pair of electromagnetic solenoids facing each other with the operation lever interposed therebetween, there occurs a difference between the shifting force in one direction and the shifting force in the other direction when operation forces of the pair of electromagnetic solenoids undergo a change. When the pair of electromagnetic solenoids constituting the shift actuator are so arranged that the moving iron cores operate on a horizontal plane, there occurs no change in the of shifting forces of the pair of electromagnetic solenoids. Owing to the requirement of layout, however, it often becomes necessary to arrange the electromagnetic solenoids in an inclined manner with respect to the horizontal direction. That is, in the shift actuator in which the pair of electromagnetic solenoids are arranged in an inclined manner with respect to the horizontal direction, the one electromagnetic solenoid which operates downward along the inclination produces an increased operation force due to the gravity of the moving member, while the other electromagnetic solenoid which operates upward along the inclination produces a decreased operation force due to the gravity of the moving member. Therefore, the shifting force may often become insufficient in the shifting operation by the other electromagnetic solenoid which produces the decreased operation force.

SUMMARY OF THE INVENTION

It is, therefore, an object of the present invention to provide a gear change device equipped with a shift actuator, which is so constituted as to compensate the influence of gravity on the moving members of a pair of electromagnetic solenoids constituting the shift actuator, and is capable of producing nearly the same shifting forces at all time.

In order to accomplish the above-mentioned object according to the present invention, there is provided a gear change device comprising:

a shift lever support mechanism arranged in a casing to support a shift lever in a manner to slide in the axial direction and to rotate;

a select actuator for operating said shift lever in the axial direction which is the direction of selection; and a shift actuator for rotating said shift lever support mechanism in the direction of shift; wherein said shift actuator has:

an operation lever of which the base portion is mounted on said shift lever support mechanism;

a pair of electromagnetic solenoids arranged facing each other with the acting portion of said operation lever interposed therebetween and inclined with respect to the horizontal direction; and a resilient urging means that produces the urging force in the direction same as the direction of operation of the one electromagnetic solenoid which operates upward along the inclination, out of the pair of electromagnetic solenoids.

The resilient urging force of the resilient urging means is set to a value that compensates the influence of gravity on the moving members of the pair of electromagnetic solenoids, caused by the inclination. The resilient urging means comprises an extension spring which urges the operation lever toward the direction of operation by the one electromagnetic solenoid. Further, the resilient urging means comprises a compression spring which urges the moving iron core of the one electromagnetic solenoid in the direction of operation.

In order to solve the above-mentioned technical problem, further, the present invention provides a gear change device comprising:

a shift lever support mechanism arranged in a casing to support a shift lever in such a manner as to slide in the axial direction and to rotate;

an operation lever of which the base portion is mounted on said shift lever support mechanism;

a select actuator for operating said shift lever in the axial direction which is the direction of selection; and a shift actuator having a pair of electromagnetic solenoids arranged facing each other with the acting portion of said operation lever interposed therebetween; wherein the pair of electromagnetic solenoids constituting said shift actuator are arranged on the same axis inclined with respect to the horizontal direction; and the angle of intersection of said operation lever and the axis on which said pair of electromagnetic solenoids are arranged is so set as to compensate the influence of gravity on the moving members of said pair of electromagnetic solenoids produced by said inclination.

In order to solve the above-mentioned technical problem, further, the present invention provides a gear change device comprising:

a shift lever support mechanism arranged in a casing to support a shift lever in such a manner as to slide in the axial direction and to rotate;

an operation lever of which the base portion is mounted on said shift lever support mechanism;

a select actuator for operating said shift lever in the axial direction which is the direction of selection; and a shift actuator having a pair of electromagnetic solenoids arranged facing each other with the acting portion of said operation lever interposed therebetween; wherein the pair of electromagnetic solenoids constituting said shift actuator are arranged being inclined with respect to the horizontal direction; and the operation rods of said pair of electromagnetic solenoids are brought into contact with the acting portion of said operation lever in a predetermined offset amount in the lengthwise direction, the operation rod of the one electromagnetic solenoid that operates downward along the inclination being so constituted as to come into contact with said acting portion of said operation lever on the side closer to the base portion thereof than on the side of the operation rod of the other electromagnetic solenoid that operates upward along the inclination.

The offset amount is set to a value that compensates the influence of gravity on the moving members of the pair of electromagnetic solenoids produced by the inclination.

BRIEF DESCRIPTION OF THE DRAWINGS

FIG. 3 is a view illustrating the operation of a select actuator that constitutes the gear change device shown in FIG. 1;

DETAILED DESCRIPTION OF THE PREFERRED EMBODIMENTS

The gear change device constituted according to the present invention will now be described in further detail with reference to the accompanying drawings illustrating preferred embodiments of the invention.

Figure 1:
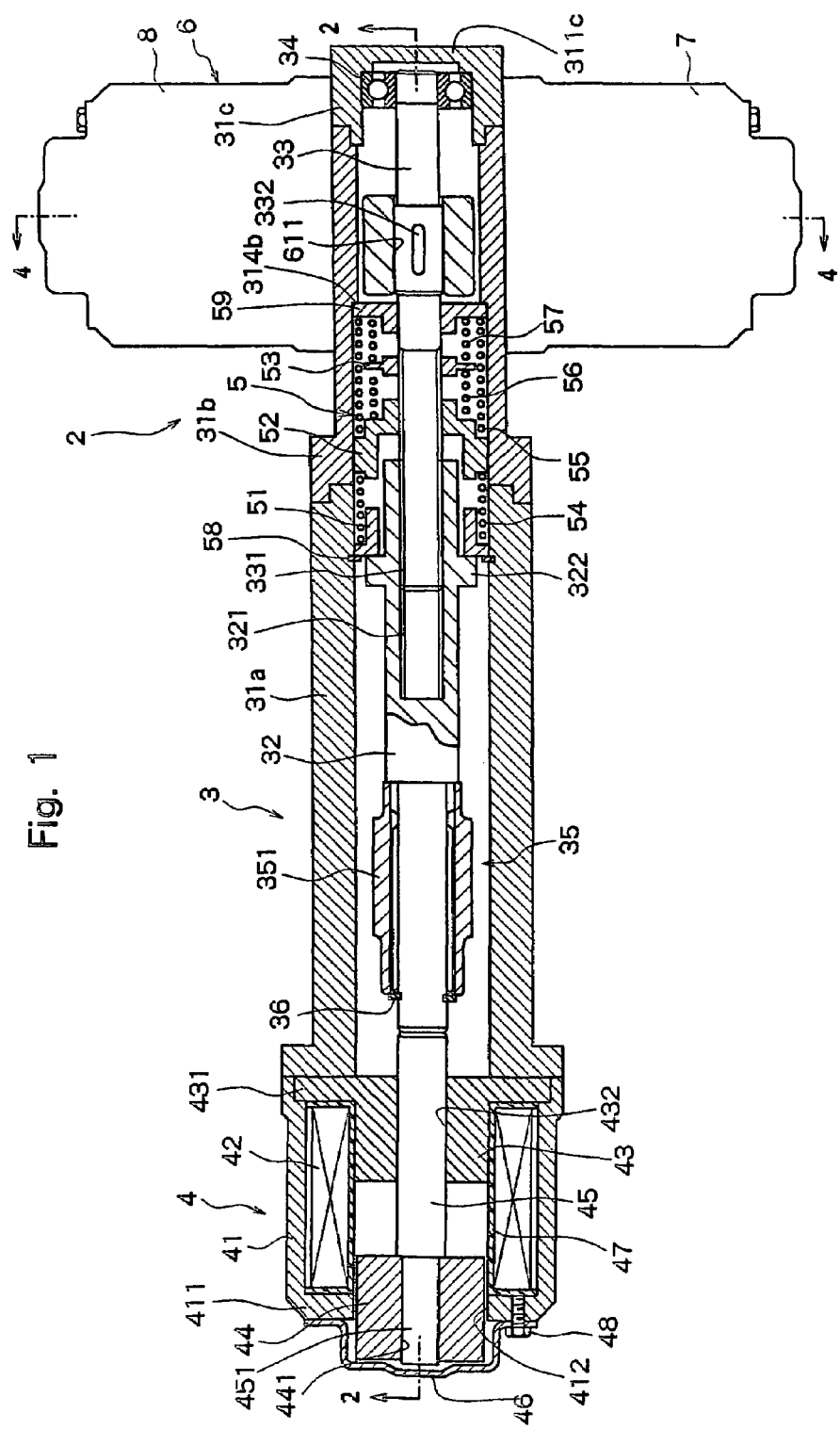
FIG. 1 is a sectional view illustrating an embodiment of a gear change device constituted according to the present invention.
Figure 2:
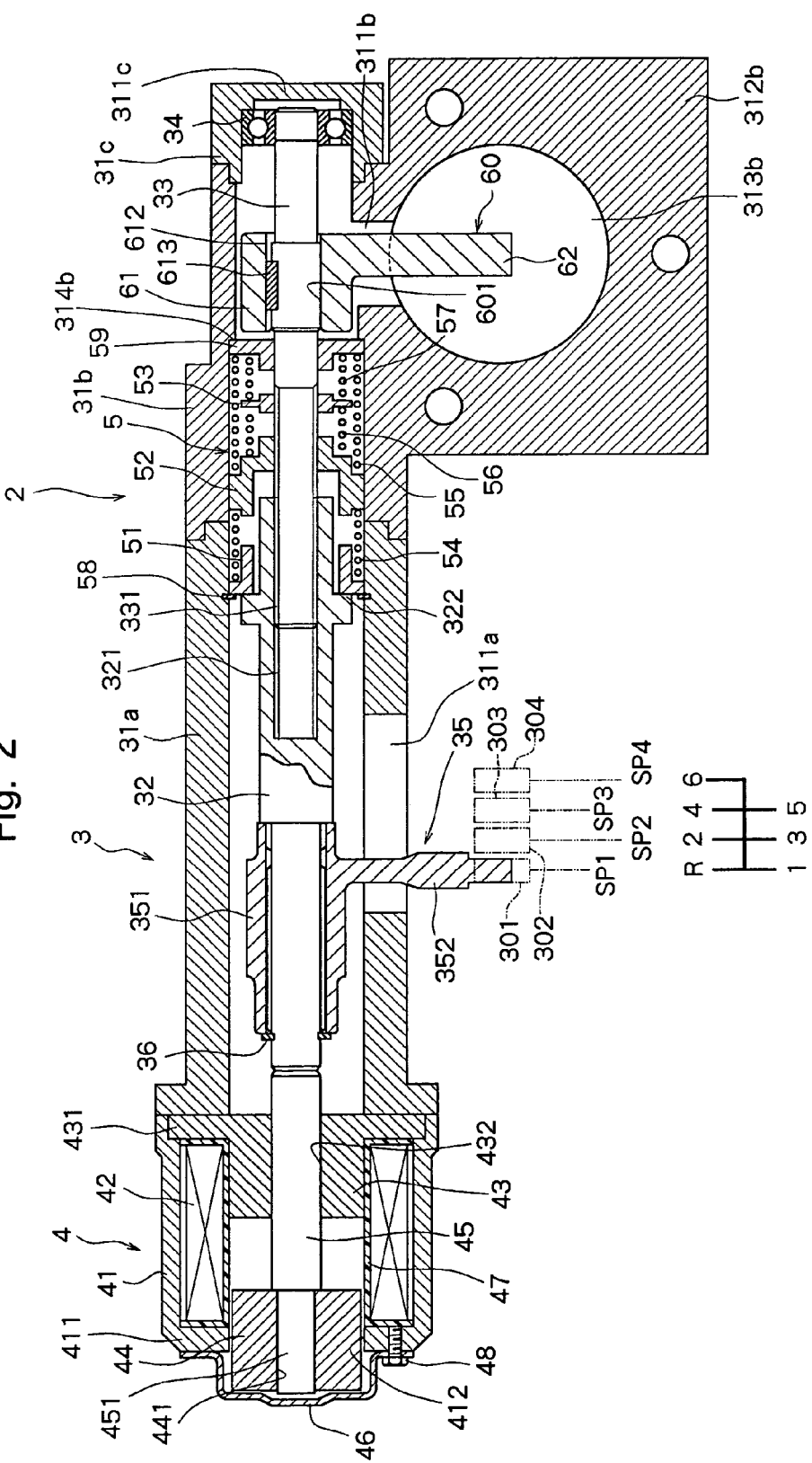
FIG. 2 is a sectional view along the line 2—2 in FIG. 1.
Figure 4:
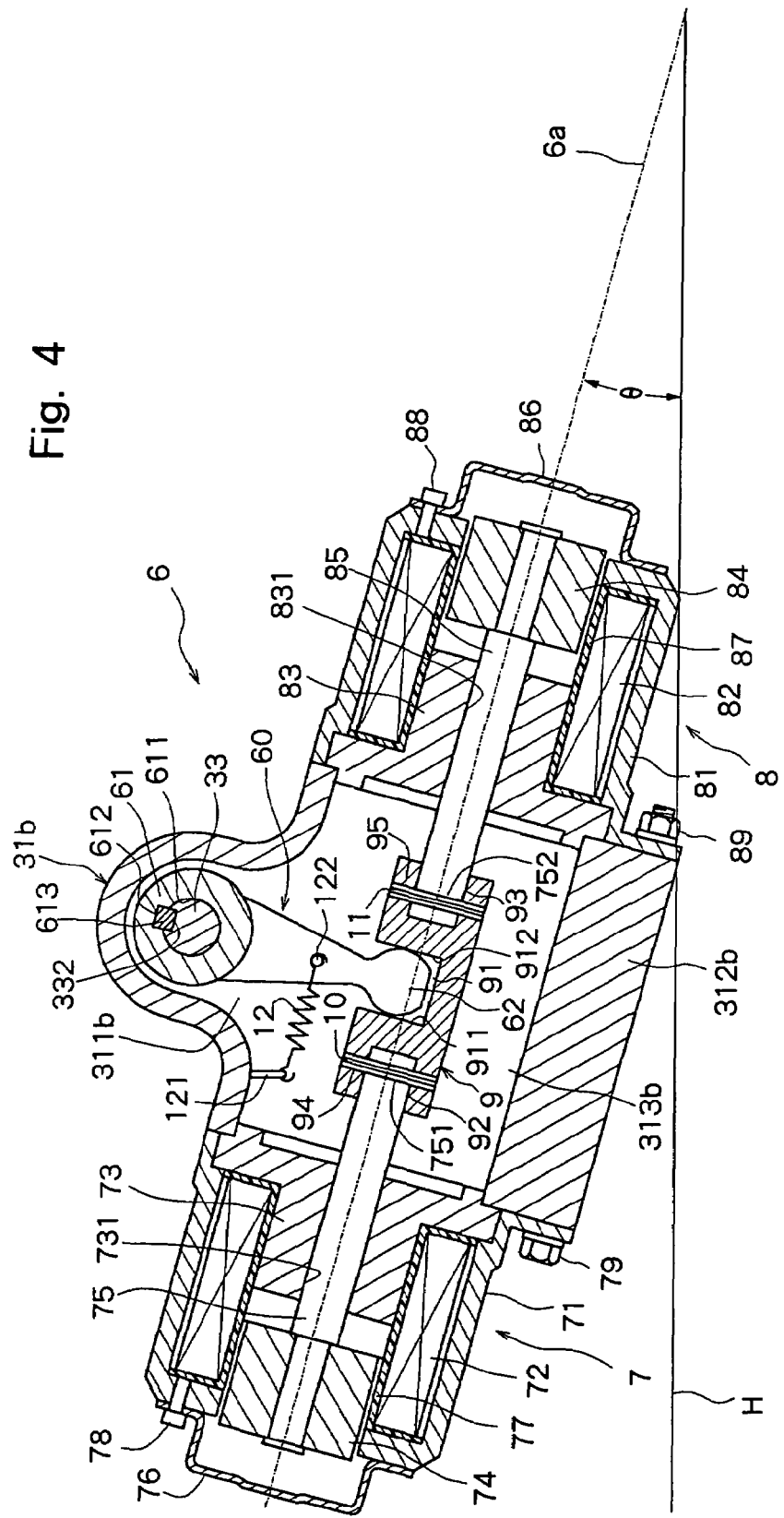
FIG. 4 is a sectional view along the line 4—4 in FIG. 1.

FIG. 1 is a sectional view illustrating an embodiment of the gear change device constituted according to the present invention, FIG. 2 is a sectional view along the line 2—2 in FIG. 1, and FIG. 4 is a sectional view along the line 4—4 in FIG. 1.

The gear change device 2 according to the illustrated embodiment is constituted by a select actuator 3 and a shift actuator 6. The select actuator 3 in the illustrated embodiment has three casings 31a, 31b and 31c formed in a cylindrical shape and coupled to each other. The casing 31a on the left side is opened at both ends thereof and has an opening 311a formed in the central lower portion thereof. The central casing 31b is opened at its both ends thereof and has an opening 311b formed in the lower portion at the right end thereof in FIGS. 1 and 2. The central casing 31b has a shift actuator-mounting portion 312b formed protruding downward. In the shift actuator-mounting portion 312b, an opening 313b communicating with the opening 311b is formed at right angles with the axial direction of the casing. The casing 31c on the right side is opened at its left end in FIGS. 1 and 2, and has an end wall 311c at the right end in FIGS. 1 and 2.

A control shaft 32 is arranged in the three casings 31a, 31b and 31c constituted as described above. The control shaft 32 is provided with a fitting portion 321 having an internal spline on the right side in FIGS. 1 and 2. An external spline 331 formed at the left end of a rotary shaft 33 is spline-fitted to the fitting portion 321 in such a manner as to slide in the axial direction. In FIGS. 1 and 2, the rotary shaft 33 is rotatably supported at its right side portion by a bearing 34 mounted on the right end of the casing 31c of the right side. The rotary shaft 33 thus supported is rotated in the direction of shift by a shift actuator 6 that will be described later.

The control shaft 32 thus spline-fitted to the rotary shaft 33 is arranged in the casings 31a, 31b and 31c so as to slide in the axial direction and to rotate. A shift lever 35 is mounted onto the control shaft 32. The shift lever 35 comprises a cylindrical mounting portion 351 and a lever portion 352 protruding from the mounting portion 351 in the radial direction, the mounting portion 351 being spline-fitted to the control shaft 32. The mounting portion 351 of the shift lever 35 thus spline-fitted to the control shaft 32 is limited from moving in the axial direction by a snap ring 36 mounted on the control shaft 32. Therefore, the shift lever 35 operates, as one unit, together with the control shaft 32. Accordingly, the control shaft 32 mounting the shift lever 35 and the rotary shaft 33 constitute a shift lever support mechanism which supports the shift lever so as to slide in the axial direction and to rotate. As shown in FIG. 2, the lever portion 352 of the shift lever 35 is arranged penetrating through the opening 311a formed in the lower portion of the left casing 31a. An end of a lever portion 352 that constitutes the shift lever 35 comes into suitable engagement with the shift blocks 301, 302, 303 and 304 that are arranged at a first select position SP1, at a second select position SP2, at a third select position SP3 and at a fourth select position SP4 and that constitute a shift mechanism of a transmission (not shown). In the illustrated embodiment, the first select position SP1 is set at a reverse gear-first gear select position, the second select position SP2 is set at a second gear-third gear select position, the third select position SP3 is set at a fourth gear-fifth gear select position, and the fourth select position SP4 is set at a sixth gear select position.

In FIGS. 1 and 2, an electromagnetic solenoid 4 arranged coaxially with the control shaft 32 is mounted on the left end of the casing 31a. The electromagnetic solenoid 4 comprises a cylindrical casing 41, an electromagnetic coil 42 arranged in the casing 41, a fixed iron core 43 arranged in the electromagnetic coil 42, a moving iron core 44 arranged coaxially with the fixed iron core 43 being opposite to one end surface (left end surface in FIG. 1) of the fixed iron core 43, an operation rod 45 mounted on the moving iron core 44, and a cover 46 mounted on one end (left end in FIGS. 1 and 2) of the cylindrical casing 41.

The cylindrical casing 41 has, at one end thereof (left end in FIGS. 1 and 2), an end wall 411 having a hole 412 at the central portion thereof and is open at the other end thereof (right end in FIGS. 1 and 2). The electromagnetic coil 42 is wound on an annular bobbin 47 made of a nonmagnetic material such as a synthetic resin or the like, and is arranged along the inner periphery of the casing 41. The fixed iron core 43 is formed of a magnetic material, has a flange portion 431 at the other end thereof (right end in FIGS. 1 and 2), and is mounted on one end of the casing 41 (on the right end in FIGS. 1 and 2) via the flange portion 431. The moving iron core 44 is formed of a magnetic material, and is constituted to come into contact with, and separate away from, the fixed iron core 43 in the axial direction. The operation rod 45 is formed of a nonmagnetic material such as a stainless steel or the like and has, at one end thereof (left end in FIGS. 1 and 2), a small-diameter portion 451. The small-diameter portion 451 of the thus constituted operation rod 45 is inserted in the hole 441 formed at the central portion of the moving iron core 44 and is caulked at its one end to mount the operation rod 45 on the moving iron core 44. The other end of the operation rod 45 thus mounted on the moving iron core 44 is arranged penetrating through the hole 432 formed in the central portion of the fixed iron core 43, so as to slide in the axial direction, and its other end surface (right end surface in FIGS. 1 and 2) is constituted to come into contact with the left end surface of the control shaft 32. The cover 46 is mounted on one end of the casing 41 by using screws 48 to cover one end of the casing 41 and one end of the moving iron core 44.

The electromagnetic solenoid 4 according to the illustrated embodiment is constituted as described above. When an electric current is fed to the electromagnetic coil 42, the fixed iron core 43 is magnetized, the moving iron core 44 is attracted by the fixed iron core 43, whereby the moving iron core 44, i.e., the operation rod 45 produces a thrust toward the right in FIGS. 1 and 2. The magnitude of the thrust produced by the moving iron core 44, i.e., produced by the operation rod 45 is determined by the amount of electric power fed to the electromagnetic coil 42.

The select actuator 3 of the illustrated embodiment has a select position-limiting mechanism 5 for limiting the position of the shift lever to the first select position SP1, to the second select position SP2, to the third select position SP3 or to the fourth select position SP4 in cooperation with the magnitude of thrust produced by the moving iron core 44, i.e., by the operation rod 45 that varies in response to the amount of electric power fed to the electromagnetic coil 42 of the electromagnetic solenoid 4. The select position-limiting mechanism 5 has the left casing 31a and the central casing 31b, a first moving ring 51, a second moving ring 52 and a third moving ring 53 arranged in such a manner as to slide along the control shaft 32 and the rotary shaft 33. The first moving ring 51 is limited from moving toward the left in FIGS. 1 and 2 by a snap ring 58 mounted on the inner peripheral surface of the left casing 31a. The first compression coil spring 54 is arranged between the first moving ring 51 and the second moving ring 52, and a second compression coil spring 55 is arranged between the second moving ring 52 and a stopper 59 which is slidably fitted onto the rotary shaft 33 and is positioned at a stepped portion 314b formed on the inner periphery of the central casing 31b. Further, a third compression coil spring 56 is arranged between the second moving ring 52 and the third moving ring 53, and a fourth compression coil spring 57 is arranged between the third moving ring 53 and the stopper 59. The spring force of the second compression coil spring 55 is set to be greater than the spring force of the first compression coil spring 54, and the spring force of the fourth compression coil spring 57 is set to be greater than the spring force of the third compression coil spring 56. Due to the spring forces of the first compression coil spring 54 and the second coil spring 55, therefore, the first moving ring 51 is thrusted leftward in FIGS. 1 and 2 to come into contact with the snap ring 58. In FIGS. 1 and 2, the first moving ring 51 is brought, at its left end, into engagement with an engaging portion 322 provided on the outer periphery of the control shaft 32.

The select actuator 3 of the illustrated embodiment is constituted as described above. The function will be described hereinafter.

When no electric power is fed (no electric current is fed) to the electromagnetic coil 42 of the electromagnetic solenoid 4 constituting the select actuator 3, the first moving ring 51, second moving ring 52 and third moving ring 53 constituting the select position-limiting mechanism 5 are positioned in states shown in FIGS. 1 and 2, where the spring forces are balanced among the first compression coil spring 54, second compression coil spring 55, third compression coil spring 56 and fourth compression coil spring 57. At this moment, the moving iron core 44 and the operation rod 45 constituting the electromagnetic solenoid 4 are brought to positions shown in FIGS. 1 and 2, so that the right end surface of the operation rod 45 comes into contact with the left end surface of the control shaft 32. And, the control shaft 32 is brought to a first select position (SP1) at which an engaging portion 322 provided on the outer periphery of the control shaft 32 comes into contact with the first moving ring 51. In this embodiment, the first select position (SP1) is set to the reverse gear-first gear select position as described above. In case the electromagnetic solenoid 4 becomes defective, therefore, the select actuator 3 brings the shift lever 35 to the reverse-first gear select position. Namely, in case the electromagnetic solenoid 4 becomes out of order, the transmission can be shifted to the first speed gear with which the vehicle starts moving or to the reverse gear, and the vehicle can be driven to a predetermined place such as a repair shop.

When a voltage of, for example, 2 V is applied to the electromagnetic coil 42 constituting the electromagnetic solenoid 4 in a state shown in FIGS. 1 and 2, the moving iron core 44 is attracted by the fixed iron core 43, whereby the moving iron core 44 and the operation rod 45 produce a thrust toward the right in the drawings. As a result, as shown in FIG. 3(a), the moving iron core 44, operation rod 45, control shaft 32 and first moving ring 51 move toward the right in the drawing, overcoming the spring force of the first compression coil spring 54. Here, the second moving ring 52 is not displaced since the spring force of the second compression coil spring 55 is greater than the spring force of the first compression coil spring 54. The moving iron core 44, operation rod 45, control shaft 32 and first moving ring 51 come to a halt at a position at which the first moving ring 51 comes into contact with the second moving ring 52. Therefore, the shift lever 35 mounted on the control shaft 32 is brought to a second select position (SP2) shown in FIG. 3(*a*).

Next, when a voltage of, for example, 4 V is applied to the electromagnetic coil 42 constituting the electromagnetic solenoid 4, the moving iron core 44 and the operation rod 45 produce an increased thrust toward the right. As a result, as shown in FIG. 3(*b*), the moving iron core 44, operation rod 45 and control shaft 32 move toward the right in the drawing in a state where the first moving ring 51 is in contact with the second moving ring 52, overcoming the spring force of the second compression coil spring 55. And, the moving iron core 44, operation rod 45, control shaft 32 and first moving ring 51 come to a halt at a position at which the second moving ring 52 is in contact with the third moving ring 53. Therefore, the shift lever 35 mounted on the control shaft 32 is brought to a third select position (SP3) shown in FIG. 3(*b*).

Next, when a voltage of, for example, 8 V is applied to the electromagnetic coil 42 constituting the electromagnetic solenoid 4, the moving iron core 44 and the operation rod 45 produce a further increased thrust toward the right. As a result, as shown in FIG. 3(*c*), the moving iron core 44, operation rod 45 and control shaft 32 move toward the right in the drawing in a state where the second moving ring 52 is in contact with the third moving ring 53, overcoming the spring forces of the second compression coil spring 55 and the fourth compression coil spring 57. And, the moving iron core 44, operation rod 45, control shaft 32 and first moving ring 51 come to a halt at a position at which the third moving ring 53 is in contact with the stopper 59. Therefore, the shift lever 35 mounted on the control shaft 32 is brought to a fourth select position (SP4) shown in FIG. 3(*c*).

As described above, the select actuator 3 constituting the gear change device 2 actuates the control shaft 32 which mounts the shift lever 35 integrally thereon, by using the electromagnetic solenoid 4, and features improved durability since it has no rotary mechanism. Unlike the actuator that uses an electric motor, further, the select actuator 3 does not require a speed reduction mechanism constituted by a ball-screw mechanism or a gear mechanism, and can be constituted in a compact size and operated at an increased speed. Besides, the illustrated select actuator 3 has a select position-limiting mechanism and is constituted to bring the control shaft 32 to any one of a plurality of select positions depending upon the thrust produced by the operation rod 45 that varies in response to the amount of electric power fed to the electromagnetic coil 42. Thus, any of the plurality of select positions can be selected by using a single electromagnetic solenoid 2, enabling the gear change device to be constructed in a compact size and at a low cost.

Next, the shift actuator 6 will be described with reference chiefly to FIG. 4.

The illustrated shift actuator 6 has an operation lever 60 mounted on the rotary shaft 33 that constitutes a shift lever support mechanism for supporting the shift lever 35 so as to slide in the axial direction and to rotate, a pair of electromagnetic solenoids, i.e., a first electromagnetic solenoid 7 and a second electromagnetic solenoid 8 for operating the operation lever 60, and an operation block 9 for transmitting the operation forces of the first electromagnetic solenoid 7 and of the second electromagnetic solenoid 8 to the operation lever 60. The first electromagnetic solenoid 7 and the second electromagnetic solenoid 8 are arranged on the same axis 6*a* which is inclined at a predetermined angle ($\theta$) with respect to the horizontal plane H. A hole 611 to be fitted to the rotary shaft 33 is formed in a base portion 61 of the operation lever 60, and the operation lever 60 is constituted to be rotated integrally with the rotary shaft 33 by fitting a key 613 into a keyway 612 formed in the inner peripheral surface of the hole 611 and into a keyway 332 formed in the outer peripheral surface of the rotary shaft 33. The operation lever 60 is arranged inserting through the opening 311*b* formed in the lower portion of the central casing 31*b*, and an acting portion 62 which is an end portion (lower end portion) of the operation lever 60 reaches the central portion of the opening 313*b* formed in the shift actuator-mounting portion 312*b*. In the illustrated embodiment, the operation lever 60 in its neutral state is arranged to be nearly at right angles with the axis 6*a* on which the first electromagnetic solenoid 7 and the second electromagnetic solenoid 8 are arranged. The operation block 9 has an engaging groove 91 formed in the intermediate portion thereof, to which the acting portion 62 of the operation lever 60 is fitted. Further, fitting holes 92 and 93 to be respectively fitted by the operation rods described later of the first electromagnetic solenoid 7 and the second electromagnetic solenoid 8 are formed at both ends of the operation block 9.

Next, the first electromagnetic solenoid 7 will be described.

The first electromagnetic solenoid 7 has the same constitution as that of the electromagnetic solenoid 4 described above, and comprises a cylindrical casing 71, an electromagnetic coil 72 wound on an annular bobbin 77 which is arranged in the casing 71 and is made of a nonmagnetic material such as a synthetic resin or the like, a fixed iron core 73 which is arranged in the electromagnetic coil 72 and is formed of a magnetic material, a moving iron core 74 which is formed of a magnetic material and is arranged coaxially with the fixed iron core 73 being opposite to one end surface of the fixed iron core 73, an operation rod 75 which is formed of a nonmagnetic material such as a stainless steel or the like and is arranged to slide in the axial direction with its one end being mounted on the moving iron core 74 and its other end passing through a hole 731 formed in the central portion of the fixed iron core 73, and a cover 76 mounted on one end of the cylindrical casing 71 by using screws 78. In the thus constituted first electromagnetic solenoid 7, the casing 71 is mounted by bolts 79 on one side surface of the shift actuator-mounting portion 312*b* provided in the central casing 31*b*, and the end of the operation rod 75 is coupled to the operation block 9. That is, the operation rod 75 of the first electromagnetic solenoid 7 is fitted, at its end portion, into a fitting hole 92 formed in one end of the operation block 9, and is coupled to the operation block 9 by forcibly inserting a split cotter pin 10 into pin holes 94 and 751 formed in the operation rod 75 and in the operation block 9. When an electric current is fed to the electromagnetic coil 72 of the first electromagnetic solenoid 7 which is mounted on one side of the shift actuator-mounting portion 312*b* and is coupled to the operation block 9, the moving iron core 74 is attracted by the fixed iron core 73. As a result, the operation rod 75 mounted on the moving iron core 74 moves toward the right lower side in FIG. 3 along the axis 6*a*, whereby one wall 911 forming the engaging groove 91 of the operation block 9 coupled to the end of the operation rod 75 acts on the acting portion 62 of the operation lever 60, causing the operation lever 60 to be turned on the rotary shaft 33 in the counterclockwise direction in FIG. 4. Thereby, the control shaft 32 spline-fitted to the rotary shaft 33 turns, and the shift lever 35 mounted on the control shaft 32 is shifted in the first direction.

Next, the second electromagnetic solenoid 8 will be described.

The second electromagnetic solenoid 8 is arranged being opposed to the first electromagnetic solenoid 7, and is mounted on the other side surface of the shift actuator-mounting portion 312b. Like the first electromagnetic solenoid 7, the second electromagnetic solenoid 8, too, comprises a cylindrical casing 81, an electromagnetic coil 82 wound on an annular bobbin 87 which is arranged in the casing 81 and is made of a nonmagnetic material such as a synthetic resin or the like, a fixed iron core 83 which is arranged in the electromagnetic coil 82 and is formed of a magnetic material, a moving iron core 84 which is formed of a magnetic material and is arranged coaxially with the fixed iron core 83 being opposite to one end surface of the fixed iron core 83, an operation rod 85 which is formed of a nonmagnetic material such as a stainless steel or the like and is arranged to slide in the axial direction with its one end being mounted on the moving iron core 84 and its other end passing through a hole 831 formed in the central portion of the fixed iron core 83, and a cover 86 mounted on one end of the cylindrical casing 81 by using screws 88. In the thus constituted second electromagnetic solenoid 8, the casing 81 is mounted by bolts 89 on the other side surface of the shift actuator-mounting portion 312b, and the end of the operation rod 85 is coupled to the operation block 9. That is, the operation rod 85 of the second electromagnetic solenoid 8 is fitted, at its end portion, into a fitting hole 93 formed in the other end of the operation block 9, and is coupled to the operation block 9 by forcibly inserting a split cotter pin 11 into pin holes 95 and 752 formed in the operation rod 75 and in the operation block 9. When an electric current is fed to the electromagnetic coil 82 of the second electromagnetic solenoid 8 which is mounted on the other side surface of the shift actuator-mounting portion 312b as described above, the moving iron core 84 is attracted by the fixed iron core 83. As a result, the operation rod 85 mounted on the moving iron core 84 moves toward the left upper side in FIG. 4 along the axis 6a, whereby the other wall 912 forming the engaging groove 91 of the operation block 9 coupled to the end of the operation rod 85 acts on the acting portion 62 of the operation lever 60, causing the operation lever 60 to be turned on the rotary shaft 33 in the clockwise direction in FIG. 4. Thereby, the control shaft 32 spline-fitted to the rotary shaft 33 turns, and the shift lever 35 mounted on the control shaft 32 is shifted in the second direction.

The shift actuator 6 of the embodiment shown in FIG. 4 has an extension coil spring 12 which works as a resilient urging means that produces the urging force in the direction same as the direction of operation of the second electromagnetic solenoid 8 which operates upward along the axis 6a or along the inclination, out of the pair of electromagnetic solenoids. The extension coil spring 12 is hooked at its one end to an engaging member 121 which is mounted on the central casing 31b, hooked at its other end to an engaging member 122 mounted on the operation lever 60, and urges the operation lever 60 to turn clockwise on the rotary shaft 33 in FIG. 4. Accordingly, the extension coil spring 12 works as the resilient urging means that produces the urging force in the direction same as the direction of operation of the second electromagnetic solenoid 8 that operates upward along the inclination, out of the pair of electromagnetic solenoids. The spring force, i.e., resilient urging force of the extension coil spring 12 is set to a value that compensates the influence of gravity on the moving members of the pair of electromagnetic solenoids, i.e., of the first electromagnetic solenoid 7 and the second electromagnetic solenoid 8, caused by the inclination.

Described below is the rotational torque of the rotary shaft 33 operated by the shift actuator 6.

A rotational torque (T1) of the rotary shaft 33 actuated by the first electromagnetic solenoid 7 constituting the shift actuator 6 is a value obtained by multiplying a thrust (F) produced by the moving iron core 74 owing to the magnetic field generated by feeding a predetermined electric power to the electromagnetic coil 72, by a length (L1) from the mounting center of the operation lever 60 up to a contacting portion onto one wall 911 forming the engaging groove 91 of the operation block 9. Here, the first electromagnetic solenoid 7 and the second electromagnetic solenoid 8 are arranged being inclined at a predetermined angle ($\theta$) with respect to the horizontal plane H. Therefore, a force (f) based on gravity of the moving members including moving iron cores 74 and 84 of the first electromagnetic solenoid 7 and of the second electromagnetic solenoid 8 and operation rods 75 and 85 acts toward the downward direction along the inclination when the electromagnetic solenoid 7 operates toward downward direction along the inclination. Therefore, the actual rotational torque (T1) of the rotary shaft 33 actuated by the first electromagnetic solenoid 7 becomes a value obtained by adding up the thrust (F) produced by the moving iron core 74 and the force (f) based on the gravity of the moving members and then, by multiply the sum by the above-defined length (L1) of the operation lever 60, i.e., (T1=(F+f)×L1).

On the other hand, a rotational torque (T2) of the rotary shaft 33 actuated by the second electromagnetic solenoid 8 is a value obtained by multiplying a thrust (F) produced by the moving iron core 84 owing to the magnetic field generated by feeding a predetermined electric power to the electromagnetic coil 82, by a length (L1) from the mounting center of the operation lever 60 up to a contacting portion onto the other wall 912 forming the engaging groove 91 of the operation block 9. Here, the first electromagnetic solenoid 7 and the second electromagnetic solenoid 8 are arranged being inclined at a predetermined angle ($\theta$) with respect to the horizontal plane H. Therefore, a force (f) based on gravity of the moving members such as moving iron cores 74 and 84 of the first electromagnetic solenoid 7 and of the second electromagnetic solenoid 8 and operation rods 75 and 85 acts toward downward direction along the inclination when the electromagnetic solenoid 8 operates toward upward direction along the inclination. Therefore, the actual rotational torque (T2) of the rotary shaft 33 actuated by the second electromagnetic solenoid 8 becomes a value obtained by subtracting the force (f) based on the gravity of the moving members from the thrust (F) produced by the moving iron core 84 and then, by multiplying by the above-defined length (L1) of the operation lever 60, i.e., (T2=(F−f)×L1).

If the rotational torque (T1=(F+f)×L1) of the rotary shaft 33 actuated by the first electromagnetic solenoid 7 is adjusted to be equal to the rotational torque (T2=(F−f)×L1) of the rotary shaft 33 actuated by the second electromagnetic solenoid 8, i.e., (T1=T2), then, the shifting force by the first electromagnetic solenoid 7 becomes equal to the shifting force by the second electromagnetic solenoid 8. Accordingly, in order that the rotational torque (T1) of the rotary shaft 33 actuated by the first electromagnetic solenoid 7 becomes equal to the rotational torque (T2) of the rotary shaft 33 actuated by the second electromagnetic solenoid 8, the spring force or the resilient urging force of the extension coil spring 12 working as the resilient urging means that produces the urging force in the direction same as the direction of operation of the second electromagnetic solenoid 8 may be set to a value that cancels the force (f) based on the gravity of the moving members of the first electromagnetic solenoid 7 and the second electromagnetic solenoid 8.

Next, another embodiment of the shift actuator 6 will be described with reference to FIG. 5. In the embodiment shown in FIG. 5, the same members as those of the embodiment shown in FIG. 4 are denoted by the same reference numerals but their description is not repeated.

Figure 5:
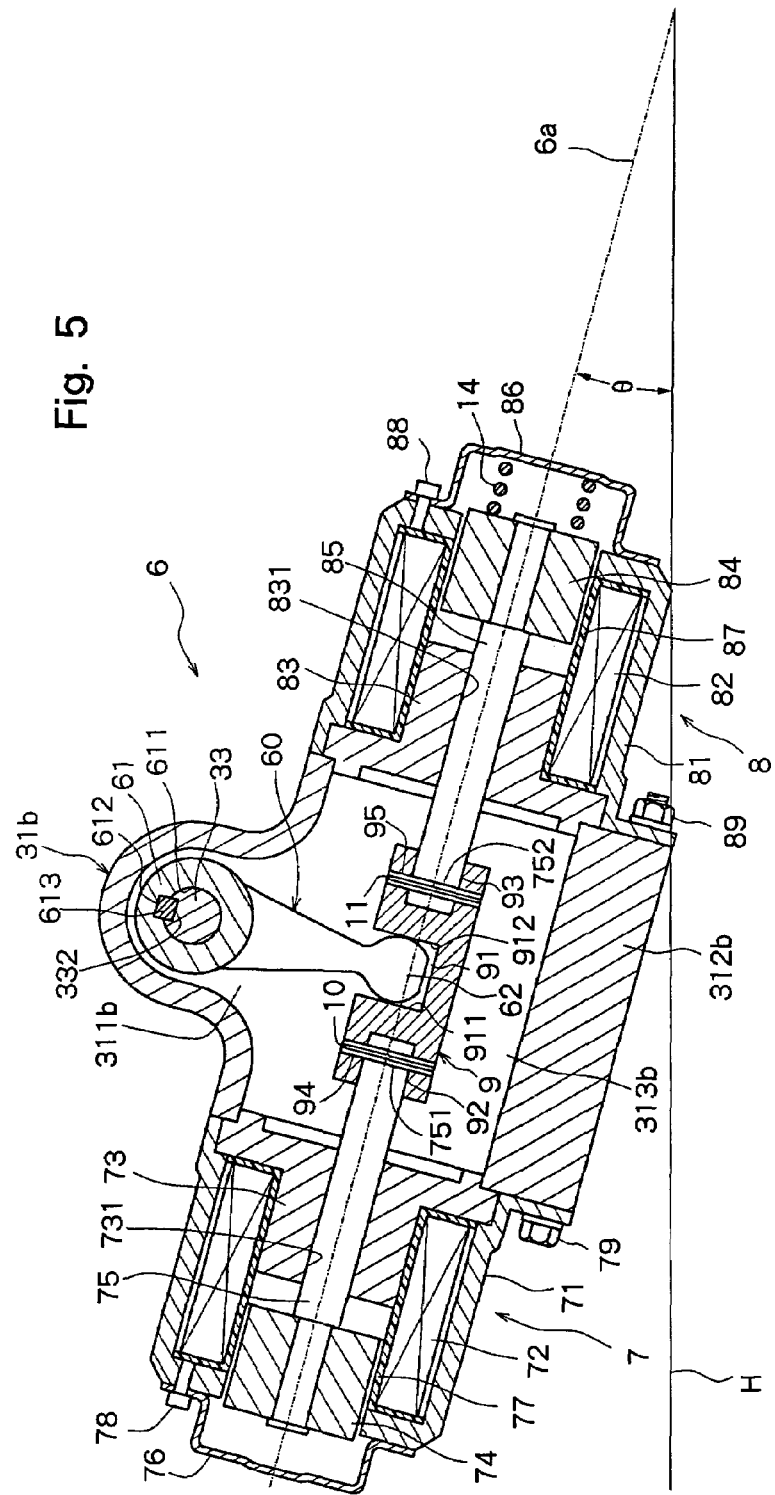
FIG. 5 is a sectional view illustrating another embodiment of a shift actuator that constitutes the gear change device of the present invention.

In the shift actuator 6 of the embodiment shown in FIG. 5, a resilient urging means is installed in the second electromagnetic solenoid 8 that operates toward the left upper side along the axis 6a, i.e., along the inclination in FIG. 5, to compensate the influence of gravity on the moving members of the first electromagnetic solenoid 7 and the second electromagnetic solenoid 8. That is, the second electromagnetic solenoid 8 has a compression coil spring 14 arranged between the moving iron core 84 and the cover 86. The compression coil spring 14 produces the urging force in the direction same as the direction of operation of the second electromagnetic solenoid 8. The spring force or the resilient urging force of the compression coil spring 14 may be set to a value that cancels the force (f) based on the gravity of the moving members of the first electromagnetic solenoid 7 and the second electromagnetic solenoid 8.

The above-mentioned embodiments have dealt with the examples of using the extension coil spring 12 and the compression coil spring 14 as a resilient urging means for producing the urging force in the direction same as the direction of operation by one of the pair of electromagnetic solenoids, which operates upward along the inclination. It, however, needs not be pointed out that a spiral spring or a pneumatic spring may be used in their place, as a matter of course.

Next, the shift actuator 6 according to a further embodiment will be described with reference to FIG. 6. In the embodiment shown in FIG. 6, the same members as those of the embodiment shown in FIGS. 4 and 5 are denoted by the same reference numerals.

Like the shift actuator shown in FIGS. 4 and 5, the illustrated shift actuator 6 has a pair of electromagnetic solenoids, i.e., a first electromagnetic solenoid 7 and a second electromagnetic solenoid 8, for operating the operation lever 60 mounted on the rotary shaft 33 of the select actuator. The first electromagnetic solenoid 7 and the second electromagnetic solenoid 8 are arranged on the same axis 6a which is inclined at a predetermined angle (θ) with respect to the horizontal plane H. A hole 611 to be fitted to the rotary shaft 33 is formed in a base portion 61 of the operation lever 60, and the operation lever 60 is constituted to be rotated integrally with the rotary shaft 33 by fitting a key 613 into a keyway 612 formed in the inner peripheral surface of the hole 611 and into a keyway 332 formed in the outer peripheral surface of the rotary shaft 33. The operation lever 60 is arranged inserting through the opening 311b formed in the lower portion of the central casing 31b, and an acting portion 62 which is an end portion (lower end portion) of the operation lever 60 reaches the central portion of the opening 313b formed in the shift actuator-mounting portion 312b. The acting portion 62 of the operation lever 60 has side surfaces formed in a spherical shape or in an arcuate shape so as to be faced to the first electromagnetic solenoid 7 and to the second electromagnetic solenoid 8. In the illustrated embodiment, the operation lever 60 in its neutral state is arranged to be nearly perpendicular to the horizontal surface H. Therefore, the first electromagnetic solenoid 7, second electromagnetic solenoid 8 and operation lever 60 are arranged at an angle (α) of intersection.

Next, the first electromagnetic solenoid 7 will be described.

The first electromagnetic solenoid 7 has the same constitution as that of the electromagnetic solenoid 7 shown in FIGS. 4 and 5, and comprises a cylindrical casing 71, an electromagnetic coil 72 wound on an annular bobbin 77 which is arranged in the casing 71 and is made of a nonmagnetic material such as a synthetic resin or the like, a fixed iron core 73 which is arranged in the electromagnetic coil 72 and is formed of a magnetic material, a moving iron core 74 which is formed of a magnetic material and is arranged coaxially with the fixed iron core 73 being opposite to one end surface of the fixed iron core 73, an operation rod 75 which is formed of a nonmagnetic material such as a stainless steel or the like and is arranged to slide in the axial direction with its one end being mounted on the moving iron core 74 and its other end passing through a hole 731 formed in the central portion of the fixed iron core 73, and a cover 76 mounted on one end of the cylindrical casing 71 by using screws 78. A compression coil spring 70 is arranged between the moving iron core 74 and the cover 76. The compression coil spring 70 is for eliminating a gap between the acting portion 62 of the operation lever 60 and the operation rod 75, and is not necessary needed. In the thus constituted first electromagnetic solenoid 7, the casing 71 is mounted by bolts 79 on one side surface of the shift actuator-mounting portion 312b provided in the central casing 31b, and the end of the operation rod 75 in its neutral state is brought into contact with a first contact point 62a on the side surface of the acting portion 62 of the operation lever 60. When an electric current is fed to the electromagnetic coil 72 of the first electromagnetic solenoid 7 which is thus mounted on one side of the shift actuator-mounting portion 312b, the moving iron core 74 is attracted by the fixed iron core 73. As a result, the moving iron core 74 and the operation rod 75 move toward the right lower side in FIG. 6 along the axis 6a, whereby the end thereof acts on the acting portion 62 of the operation lever 60, causing the operation lever 60 to be turned on the rotary shaft 33 in the counterclockwise direction in FIG. 6. Thereby, the control shaft 32 spline-fitted to the rotary shaft 33 turns, and the shift lever 35 mounted on the control shaft 32 is shifted in the first direction.

Next, the second electromagnetic solenoid 8 will be described.

The second electromagnetic solenoid 8 is arranged being opposed to the first electromagnetic solenoid 7, and is mounted on the other side surface of the shift actuator-mounting portion 312b. Like the first electromagnetic solenoid 7, the second electromagnetic solenoid 8, too, comprises a cylindrical casing 81, an electromagnetic coil 82 wound on an annular bobbin 87 which is arranged in the casing 81 and is made of a nonmagnetic material such as a synthetic resin or the like, a fixed iron core 83 which is arranged in the electromagnetic coil 82 and is formed of a magnetic material, a moving iron core 84 which is formed of a magnetic material and is arranged coaxially with the fixed iron core 83 being opposite to one end surface of the fixed iron core 83, an operation rod 85 which is formed of a nonmagnetic material such as a stainless steel or the like and is arranged to slide in the axial direction with its one end being mounted on the moving iron core 84 and its other end passing through a hole 831 formed in the central portion of the fixed iron core 83, and a cover 86 mounted on one end of the cylindrical casing 81 by using screws 88. A compression coil spring 80 is arranged between the moving iron core 84 and the cover 86. The compression coil spring 80 is for eliminating a gap between the acting portion 62 of the operation lever 60 and the operation rod 85, and is not necessary needed. In the thus constituted second electromagnetic solenoid 8, the casing 81 is mounted by bolts 89 on the other side surface of the shift actuator-mounting portion 312*b*, and the end of the operation rod 85 in its neutral state is brought into contact with a second contact point 62*b* on the side surface of the acting portion 62 of the operation lever 60. The length (L2) from the mounting center of the operation lever 60 to the second contact point 62*b* is larger than the length (L1) of therefrom to the first contact point 62*a* (i.e., L1<L2). When an electric current is fed to the electromagnetic coil 82 of the second electromagnetic solenoid 8 which is mounted on the other side of the shift actuator-mounting portion 312*b*, the moving iron core 84 is attracted by the fixed iron core 83. As a result, the moving iron core 84 and the operation rod 85 move toward the left upper side in FIG. 6 along the axis 6*a*, whereby the end thereof acts on the acting portion 62 of the operation lever 60, causing the operation lever 60 to be turned on the rotary shaft 33 in the clockwise direction in FIG. 6. Thereby, the control shaft 32 spline-fitted to the rotary shaft 33 turns, and the shift lever 35 mounted on the control shaft 32 is shifted in the second direction.

Described below is the rotational torque of the rotary shaft 33 mounting the operation lever 60 and is operated by the first electromagnetic solenoid 7 and the second electromagnetic solenoid 8 that constitute the shift actuator shown in FIG. 6.

A rotational torque (T1) of the rotary shaft 33 actuated by the first electromagnetic solenoid 7 is a value obtained by multiplying a thrust (F) produced by the moving iron core 74 owing to the magnetic field generated by feeding a predetermined electric power to the electromagnetic coil 72, by a length (L1) from the mounting center of the operation lever 60 up to the first contact point 62*a*. Here, the first electromagnetic solenoid 7 is arranged being inclined at a predetermined angle ($\theta$) with respect to the horizontal plane H. Therefore, a force (f) based on the gravity of the moving members including moving iron cores 74 and 84 of the first electromagnetic solenoid 7 and of the second electromagnetic solenoid 8 and operation rods 75 and 85, acts in the downward direction along the inclination when the electromagnetic solenoid 7 operates downward along the inclination. Therefore, the actual rotational torque (T1) of the rotary shaft 33 mounting the operation lever 60, which is actuated by the first electromagnetic solenoid 7 becomes a value obtained by adding up the thrust (F) produced by the moving iron core 74 and the force (f) based on the gravity of the moving members and then, by multiply the sum by the above-defined length (L1) of the operation lever 60, i.e., (T1=(F+f)×L1).

On the other hand, a rotational torque (T2) of the rotary shaft 33 actuated by the second electromagnetic solenoid 8 is a value obtained by multiplying a thrust (F) produced by the moving iron core 84 owing to the magnetic field generated by feeding a predetermined electric power to the electromagnetic coil 82, by a length (L2) from the mounting center of the operation lever 60 up to the second contact point 62*b*. Here, the second electromagnetic solenoid 8 is arranged being inclined at a predetermined angle ($\theta$) with respect to the horizontal plane H. Therefore, a force (f) based on gravity of the moving members such as moving iron cores 74 and 84 of the first electromagnetic solenoid 7 and of the second electromagnetic solenoid 8 and operation rods 75 and 85, acts in the downward direction along the inclination when the electromagnetic solenoid 8 operates upward along the inclination. Therefore, the actual rotational torque (T2) of the rotary shaft 33 actuated by the second electromagnetic solenoid 8 becomes a value obtained by subtracting the force (f) based on the gravity of the moving members from the thrust (F) produced by the moving iron core 84 and then, by multiplying by the above-defined length (L2) of the operation lever 60, i.e., (T2=(F−f)×L2).

If the rotational torque (T1=(F+f)×L1) of the rotary shaft 33 actuated by the first electromagnetic solenoid 7 is adjusted to be equal to the rotational torque (T2=(F−f)×L2) of the rotary shaft 33 actuated by the second electromagnetic solenoid 8, i.e., (T1=T2), then, the shifting force by the first electromagnetic solenoid 7 becomes equal to the shifting force by the second electromagnetic solenoid 8. Accordingly, in order that the rotational torque (T1) of the rotary shaft 33 actuated by the first electromagnetic solenoid 7 becomes equal to the rotational torque (T2) of the rotary shaft 33 actuated by the second electromagnetic solenoid 8, the lengths (L1) and (L2) of the operation lever 60 may be so set as to cancel the force (f) which is based on the gravity of the moving members. Namely, the angle ($\alpha$) of intersection of the operation lever 60 and the axis 6*a* on which the first electromagnetic solenoid 7 and the second electromagnetic solenoid 8 are arranged may be so set as to compensate the influence of gravity on the moving members.

Next, still further embodiment of the shift actuator 6 will be described with reference to FIG. 7. In the embodiment shown in FIG. 7, the same members as those of the embodiment shown in FIGS. 4 to 6 are denoted by the same reference numerals.

Figure 6:
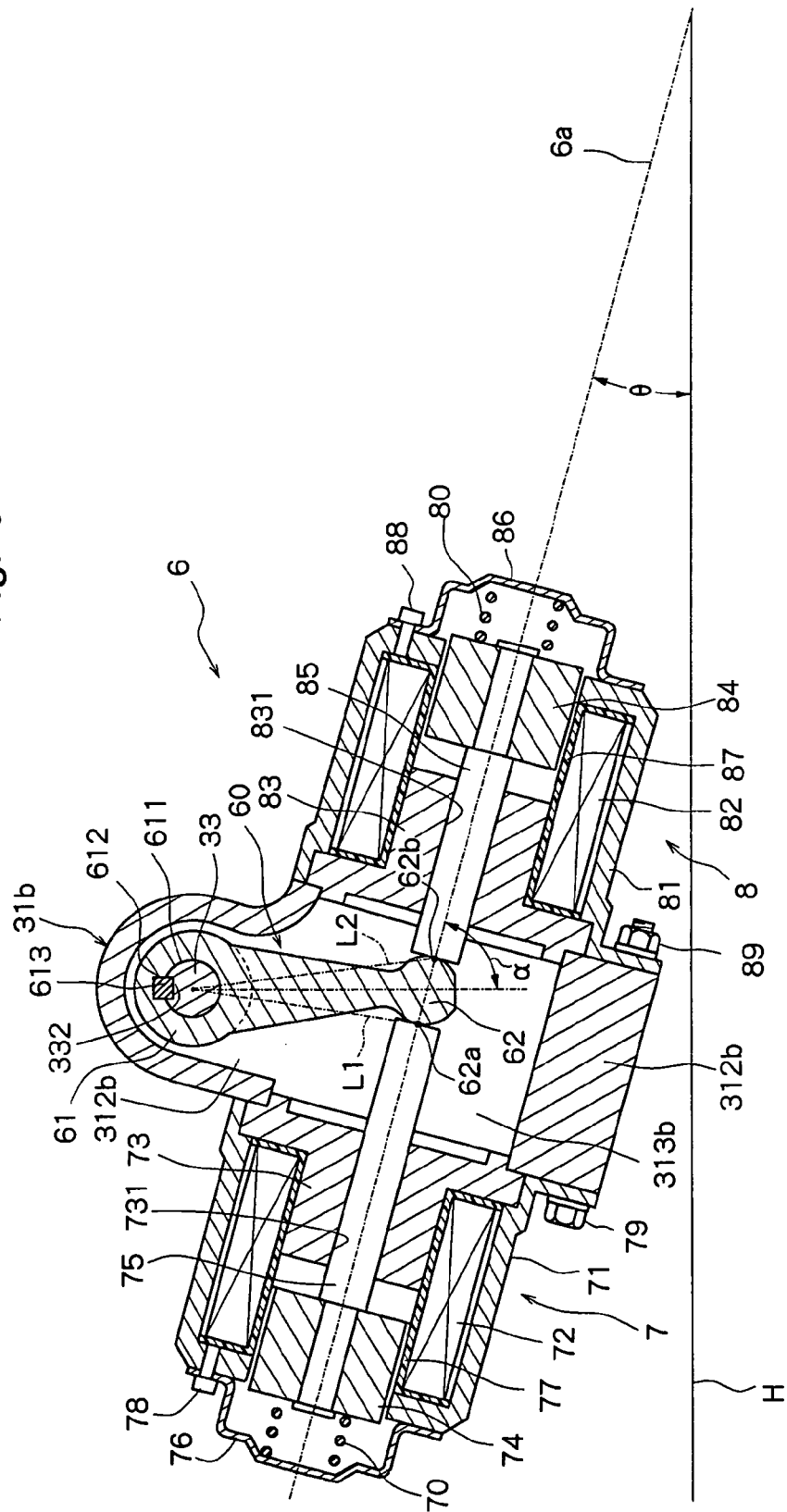
FIG. 6 is a sectional view illustrating a further embodiment of the shift actuator that constitutes the gear change device of the present invention.
Figure 7:
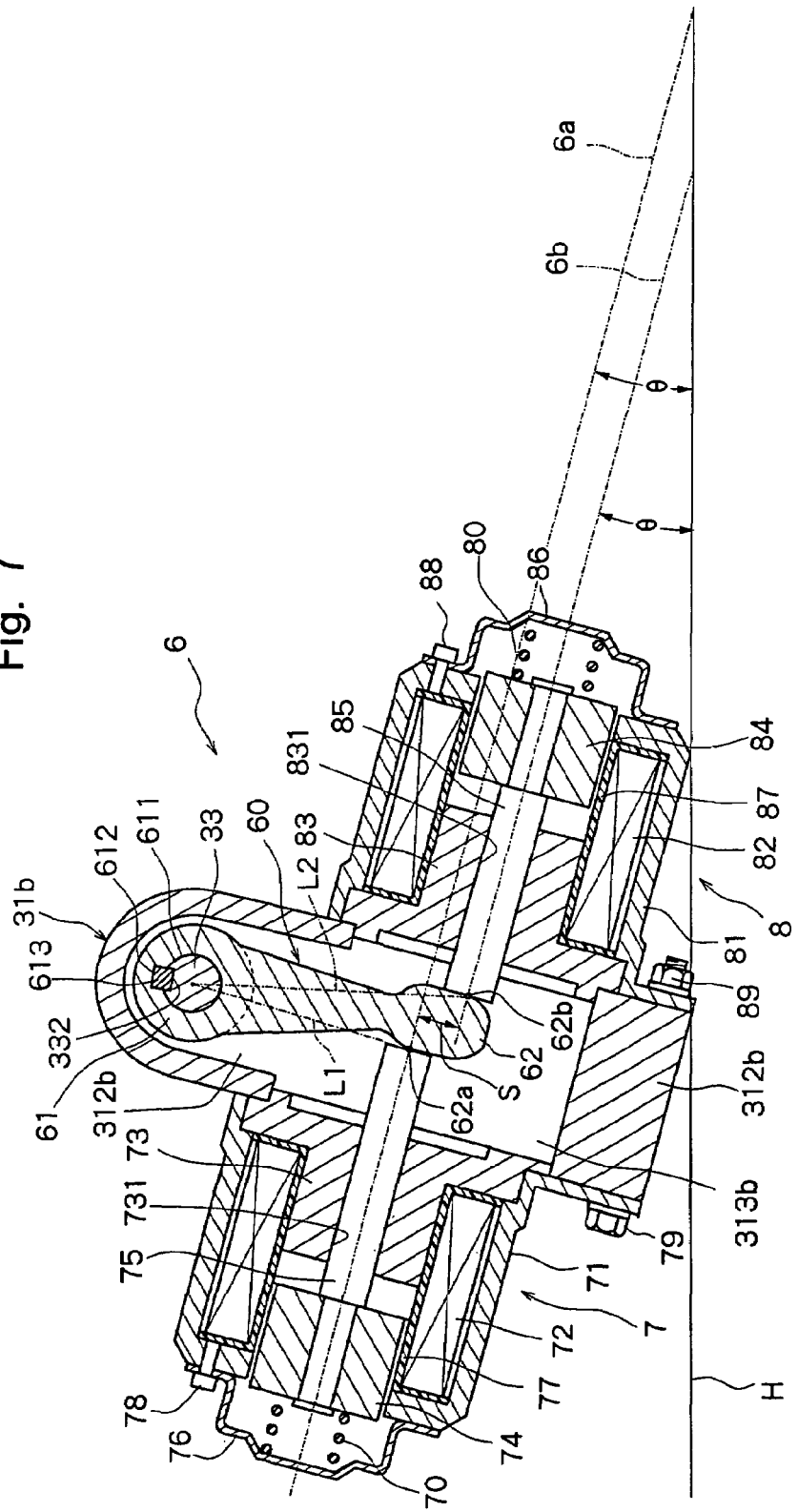
FIG. 7 is a sectional view illustrating a still further embodiment of the shift actuator that constitutes the gear change device of the present invention.

The shift actuator 6 shown in FIG. 7 is equipped with a pair of electromagnetic solenoids, i.e., a first electromagnetic solenoid 7 and a second electromagnetic solenoid 8, for operating the operation lever 60 mounted on the rotary shaft 33 of the select actuator 3 like in the shift actuator shown in FIGS. 4 to 6. The first electromagnetic solenoid 7 and the second electromagnetic solenoid 8 are arranged on the axes 6*a* and 6*b* which are inclined at a predetermined angle ($\theta$) with respect to the horizontal plane H. A hole 611 to be fitted to the rotary shaft 33 is formed in a base portion 61 of the operation lever 60, and the operation lever 60 is constituted to be rotated integrally with the rotary shaft 33 by fitting a key 613 into a keyway 612 formed in the inner peripheral surface of the hole 611 and into a keyway 332 formed in the outer peripheral surface of the rotary shaft 33. The operation lever 60 is arranged inserting through the opening 311*b* formed in the lower portion of the central casing 31*b*, and an acting portion 62 which is an end portion (lower end portion) of the operation lever 60 reaches the central portion of the opening 313*b* formed in the shift actuator-mounting portion 312*b*. In the illustrated embodiment, the operation lever 60 in its neutral state is arranged to be nearly at right angles with the axes 6*a* and 6*b* on which the first electromagnetic solenoid 7 and the second electromagnetic solenoid 8 are arranged respectively.

Next, the first electromagnetic solenoid 7 will be described.

The first electromagnetic solenoid 7 has the same constitution as that of the electromagnetic solenoid 7 shown in FIGS. 4 to 6, and comprises a cylindrical casing 71, an electromagnetic coil 72 wound on an annular bobbin 77 which is arranged in the casing 71 and is made of a nonmagnetic material such as a synthetic resin or the like, a fixed iron core 73 which is arranged in the electromagnetic coil 72 and is formed of a magnetic material, a moving iron core 74 which is formed of a magnetic material and is arranged coaxially with the fixed iron core 73 being opposite to one end surface of the fixed iron core 73, an operation rod 75 which is formed of a nonmagnetic material such as a stainless steel or the like and is arranged to slide in the axial direction with its one end being mounted on the moving iron core 74 and its other end passing through a hole 731 formed in the central portion of the fixed iron core 73, and a cover 76 mounted on one end of the cylindrical casing 71 by using screws 78. A compression coil spring 70 is arranged between the moving iron core 74 and the cover 76. The compression coil spring 70 is for eliminating a gap between the acting portion 62 of the operation lever 60 and the operation rod 75, and is not necessary needed. In the thus constituted first electromagnetic solenoid 7, the casing 71 is mounted by bolts 79 on one side surface of the shift actuator-mounting portion 312b provided in the central casing 31b, and the end of the operation rod 75 in its neutral state is brought into contact with a first contact point 62a on the side surface of the acting portion 62 of the operation lever 60. When an electric current is fed to the electromagnetic coil 72 of the first electromagnetic solenoid 7 which is thus mounted on one side of the shift actuator-mounting portion 312b, the moving iron core 74 is attracted by the fixed iron core 73. As a result, the moving iron core 74 and the operation rod 75 move toward the right lower side in FIG. 7 along the axis 6a, whereby the end thereof acts on the acting portion 62 of the operation lever 60, causing the operation lever 60 to be turned on the rotary shaft 33 in the counterclockwise direction in FIG. 7. Thereby, the control shaft 32 spline-fitted to the rotary shaft 33 turns, and the shift lever 35 mounted on the control shaft 32 is shifted in the first direction.

Next, the second electromagnetic solenoid 8 will be described.

The second electromagnetic solenoid 8 is arranged being opposed to the first electromagnetic solenoid 7, and is mounted on the other side surface of the shift actuator-mounting portion 312b. Like the first electromagnetic solenoid 7, the second electromagnetic solenoid 8, too, comprises a cylindrical casing 81, an electromagnetic coil 82 wound on an annular bobbin 87 which is arranged in the casing 81 and is made of a nonmagnetic material such as a synthetic resin or the like, a fixed iron core 83 which is arranged in the electromagnetic coil 82 and is formed of a magnetic material, a moving iron core 84 which is formed of a magnetic material and is arranged coaxially with the fixed iron core 83 being opposite to one end surface of the fixed iron core 83, an operation rod 85 which is formed of a nonmagnetic material such as a stainless steel or the like and is arranged to slide in the axial direction with its one end being mounted on the moving iron core 84 and its other end passing through a hole 831 formed in the central portion of the fixed iron core 83, and a cover 86 mounted on one end of the cylindrical casing 81 by using screws 88. A compression coil spring 80 is arranged between the moving iron core 84 and the cover 86. The compression coil spring 80 is for eliminating a gap between the acting portion 62 of the operation lever 60 and the operation rod 85, and is not necessary needed. In the thus constituted second electromagnetic solenoid 8, the casing 81 is mounted by bolts 89 on the other side surface of the shift actuator-mounting portion 312b, and the end of the operation rod 85 in its neutral state is brought into contact with a second contact point 62b on the side surface of the acting portion 62 of the operation lever 60. When an electric current is fed to the electromagnetic coil 82 of the second electromagnetic solenoid 8 which is thus mounted on the other side of the shift actuator-mounting portion 312b, the moving iron core 84 is attracted by the fixed iron core 83. As a result, the moving iron core 84 and the operation rod 85 move toward the left upper side in FIG. 7 along the axis 6b, whereby the end thereof acts on the acting portion 62 of the operation lever 60, causing the operation lever 60 to be turned on the rotary shaft 33 in the clockwise direction in FIG. 7. Thereby, the control shaft 32 spline-fitted to the rotary shaft 33 turns, and the shift lever 35 mounted on the control shaft 32 is shifted in the second direction.

As described above, the operation rod 75 of the first electromagnetic solenoid 7 and the operation rod 85 of the second electromagnetic solenoid 8 are each brought, in their neutral state, into contact with the first contact point 62a and the second contact point 62b at the acting portion 62 of the operation lever 60. Namely, the operation rod 75 and the operation rod 85 are brought into contact with the acting portion 62 of the operation lever 60, being offset in the lengthwise direction. The operation rod 75 of the first electromagnetic solenoid 7 that operates toward an aslant and downward direction along the inclined axis 6a comes into contact with the acting portion 62 of the operation lever 60 on the side closer to the base portion 61 thereof than on the side of the operation rod 85 of the second electromagnetic solenoid 8 that operates toward an aslant and upward direction along the inclined axis 6b. Therefore, the length (L1) from the mounting center of the operation lever 60 to the first contact point 62a becomes shorter than the length (L2) from the mounting center of the operation lever 60 to the second contact point 62b, i.e., (L1<L2).

Described below is the rotational torque of the rotary shaft 33 mounting the operation lever 60 and is operated by the first electromagnetic solenoid 7 and the second electromagnetic solenoid 8 that constitute the shift actuator shown in FIG. 7.

A rotational torque (T1) of the rotary shaft 33 actuated by the first electromagnetic solenoid 7 is a value obtained by multiplying a thrust (F) produced by the moving iron core 74 owing to the magnetic field generated by feeding a predetermined electric power to the electromagnetic coil 72, by a length (L1) from the mounting center of the operation lever 60 up to the first contact point 62a. Here, the first electromagnetic solenoid 7 is arranged being inclined at a predetermined angle (θ) with respect to the horizontal plane H. Therefore, a force (f) based on the gravity of the moving members including moving iron cores 74 and 84 of the first electromagnetic solenoid 7 and of the second electromagnetic solenoid 8 and operation rods 75 and 85, acts in the downward direction along the inclination when the electromagnetic solenoid 7 operates downward along the inclination. Therefore, the actual rotational torque (T1) of the rotary shaft 33 which is actuated by the first electromagnetic solenoid 7 becomes a value obtained by adding up the thrust (F) produced by the moving iron core 74 and the force (f) based on the gravity of the moving members and then, by multiply the sum by the above-defined length (L1) of the operation lever 60, i.e., (T1=(F+f)×L1).

On the other hand, a rotational torque (T2) of the rotary shaft 33 actuated by the second electromagnetic solenoid 8 is a value obtained by multiplying a thrust (F) produced by the moving iron core 84 owing to the magnetic field generated by feeding a predetermined electric power to the electromagnetic coil 82, by a length (L2) from the mounting center of the operation lever 60 up to the second contact point 62b. Here, the second electromagnetic solenoid 8 is arranged being inclined at a predetermined angle (θ) with respect to the horizontal plane H. Therefore, a force (f) based on the gravity of the moving members such as moving iron cores 74 and 84 of the first electromagnetic solenoid 7 and of the second electromagnetic solenoid 8 and operation rods 75 and 85, acts in the downward direction along the inclination when the electromagnetic solenoid 8 operates upward along the inclination. Therefore, the actual rotational torque (T2) of the rotary shaft 33 actuated by the second electromagnetic solenoid 8 becomes a value obtained by subtracting the force (f) based on the gravity of the moving members from the thrust (F) produced by the moving iron core 84 and then, by multiplying by the above-defined length (L2) of the operation lever 60, i.e., (T2=(F−f)×L2).

If the rotational torque (T1=(F+f)×L1) of the rotary shaft 33 actuated by the first electromagnetic solenoid 7 is adjusted to be equal to the rotational torque (T2=(F−f)×L2) of the rotary shaft 33 actuated by the second electromagnetic solenoid 8, i.e., (T=T2), then, the shifting force by the first electromagnetic solenoid 7 becomes equal to the shifting force by the second electromagnetic solenoid 8. Accordingly, in order that the rotational torque (T1) of the rotary shaft 33 actuated by the first electromagnetic solenoid 7 becomes equal to the rotational torque (T2) of the rotary shaft 33 actuated by the second electromagnetic solenoid 8, the lengths (L1) and (L2) of the operation lever 60 may be so set as to cancel the force (f) which is based on the gravity of the moving members. Namely, the offset amount S between the first contact point 62a and the second contact point 62b in the lengthwise direction may be so set as to compensate the influence of gravity on the moving members.

Being constituted as described above, the gear change device according to the present invention exhibits the following action and effect.

That is, according to the present invention, a pair of electromagnetic solenoids constituting the shift actuator of the gear change device are arranged being inclined with respect to the horizontal direction, and provision is made of a resilient urging means for producing the urging force in the direction same as the direction of operation by one of the pair of electromagnetic solenoids, which operates upward along the inclination. Therefore, nearly the same shifting force can be obtained at all times even when the pair of electromagnetic solenoids are arranged in a state of being inclined with respect to the horizontal direction.

According to the present invention, further, a pair of electromagnetic solenoids constituting the shift actuator of the gear change device are arranged on the same axis which is inclined with respect to the horizontal direction, and the angle of intersection of the operation lever and the axis on which the pair of electromagnetic solenoids are arranged is so set as to compensate the influence of gravity of the pair of electromagnetic solenoids produced by the inclination.

Therefore, nearly the same shifting force can be obtained at all times even when the pair of electromagnetic solenoids are arranged in a state of being inclined with respect to the horizontal direction.

According to the present invention, further, a pair of electromagnetic solenoids constituting the shift actuator of the gear change device are arranged being inclined with respect to the horizontal direction, and the operation rods of the pair of electromagnetic solenoids are each brought into contact with the acting portion of the operation lever in a predetermined offset amount, the operation rod of the first electromagnetic solenoid that operates downward along the inclination being so constituted as to come into contact with the acting portion of the operation lever on the side closer to the base portion thereof than on the side of the operation rod of the second electromagnetic solenoid that operates upward along the inclination. Therefore, nearly the same shifting force can be obtained at all times even when the pair of electromagnetic solenoids are arranged in a state of being inclined with respect to the horizontal direction.

What we claim is:

1. A gear change device comprising:
    a casing;
    a shift lever support mechanism rotatably arranged in said casing to be slidable in the axial direction thereof;
    a shift lever supported on said shift lever support mechanism to slide and rotate therewith;
    a select actuator for sliding said shift lever in the axial direction to move said shift lever in the direction of selection; and
    a shift actuator for rotating said shift lever support mechanism to rotate said shift lever in the direction of shift,
    wherein said shift actuator comprises:
        an operation lever having a base portion mounted on said shift lever support mechanism;
        a pair of electromagnetic solenoids facing each other on a common axis, with an acting portion of said operation lever interposed therebetween, the common axis being inclined with respect to a horizontal direction; and
        a resilient urging member for producing an urging force in the direction of operation of the one of said pair of electromagnetic solenoids which operates in an upward direction along the inclined common axis, the urging force having a value that compensates for the influence of gravity on moving members of said pair of electromagnetic solenoids due to the inclination of the inclined axis, and
    wherein said resilient urging member comprises a compression spring for urging a moving iron core of the one electromagnetic solenoid in the direction of operation.

* * * * *